United States Patent Office 3,471,217
Patented Oct. 7, 1969

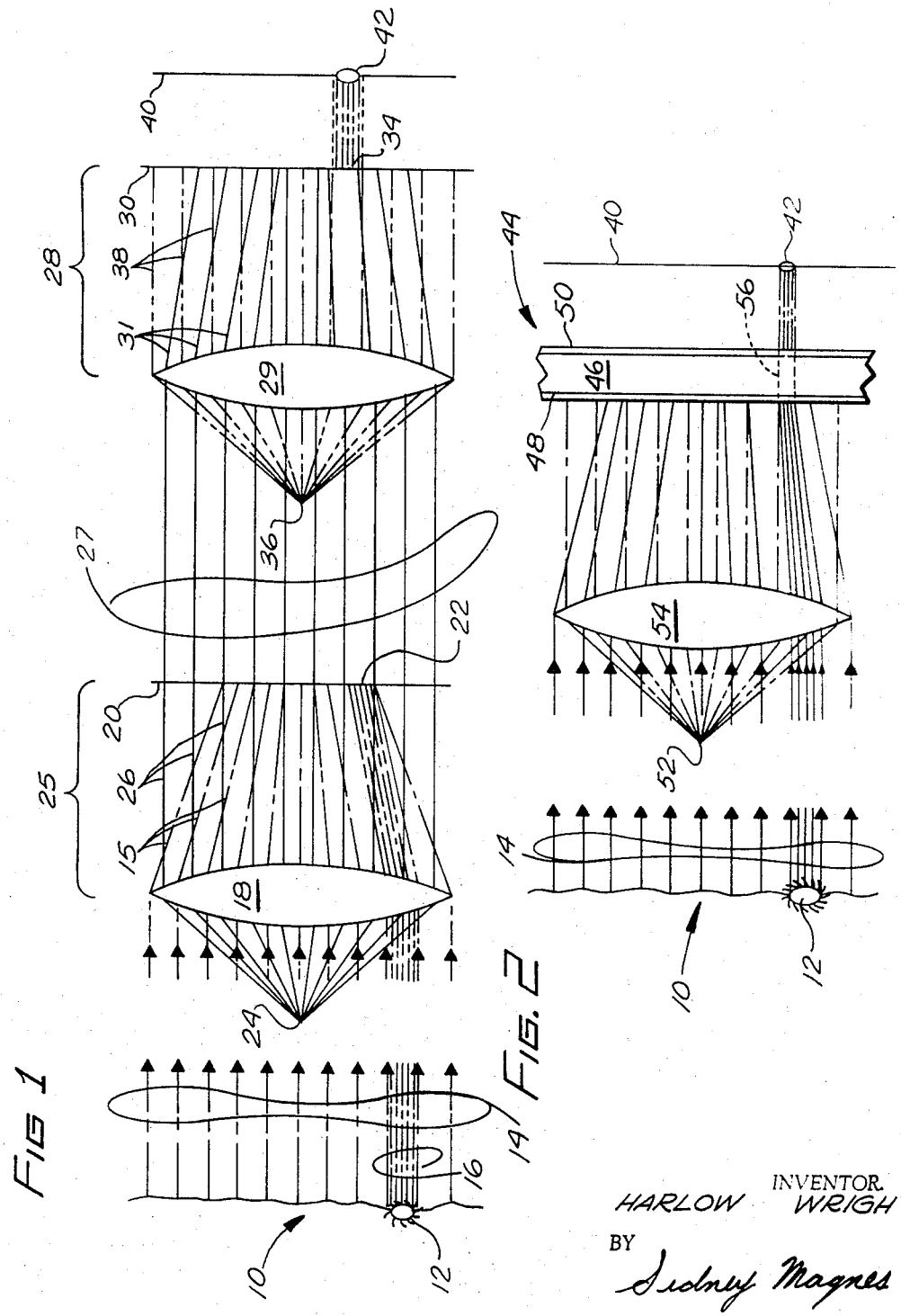

---

3,471,217
IMAGE INTENSIFIER
Harlow Wright, Santa Ana, Calif., assignor to North American Rockwell Corporation, a corporation of Delaware
Filed May 25, 1966, Ser. No. 552,850
Int. Cl. G02f 1/28, 1/36; G01b 9/02
U.S. Cl. 350—160                9 Claims

ABSTRACT OF THE DISCLOSURE

This invention relates to an image intensifier; and more particularly to an image-intensifying arrangement that uses solid-state components. Broadly speaking, the present invention causes an external scene to produce a negative and/or a positive replica of the scene on a "tenebrescent" material; and a high-intensity light that does not affect the tenebrescent material is then directed through these replicas to produe a bright intensified display on a screen, or on a utilization device.

BACKGROUND

It is frequently desirable to intensify or brighten the image of a scene, such as selected stars in the sky, or a dimly lit scene that is to be photographed, telecast, or viewed at night. Prior-art intensifier systems have generally used evacuated cathode ray tubes; and, while these have achieved the desired result, the equipment has tended to be bulky, heavy, and complex.

OBJECTS AND DRAWINGS

It is an object of the present invention to provide an improved image intensifier.

It is another object of the present invention to provide an image intensifier using only solid-state nonevacuated components.

It is another object of the invention to provide an image intensifier that is compact, relatively lightweight, and readily portable.

The attainment of these objects and others will be realized from the teaching of the following specification, taken in conjunction with the drawings of which:

FIGURE 1 shows one embodiment of the invention; and

FIGURE 2 shows a second embodiment of the invention.

SYNOPSIS

Broadly speaking, the present invention causes the external scene to produce a negative and/or a positive replica of the scene on a "tenebrescent" material; and a high-intensity light is then directed through these replicas to produce a bright intensified display on a screen, or on a utilization device.

DESCRIPTION OF INVENTION

The invention will be understood from FIGURE 1, wherein reference character 10 indicates a scene that is to be intensified; scene 10 comprising, in the illustration, an electromagnetic-energy-radiating object 12—such as a star—in a relatively dark background. The electromagnetic radiations from scene 10 are indicated by the rays of light beam 14, and will be called the "signal." Included in a signal light beam 14 are a group 16 of light rays from star 12. Light beam 14 impinges upon a first optical system 18 that images the light beam 14 onto a "tenebrescent" material 20; the tenebrescent characteristic being discussed, among other places, in U.S. Patent 3,-196,743, "Light Modulation Device Employing a Scotophoric Light Valve," issued July 27, 1965, to John R. Dreyer.

A discussion of "tenebrescent" materials requires a slight digression at this point. There are presently available from companies, such as American Cyanamid, Corning Glass, Pittsburgh Plate Glass, and National Cash Register Company, a plurality of tenebrescent materials which have the property of reversibly darkening and bleaching under suitable irradiation. One of the more easily understood tenebrescent materials is one known as "photochromic glass"; this glass having the characteristic, similar to photographic film, of turning dark and tending toward opacity in those areas where illumination impinges onto the photochromic glass. However, unlike photographic film, the darkened areas of the photochromic glass revert to transparency when the illumination is removed. In some glasses the darkening is due to visible radiations, in other glasses the darkening is due to ultraviolet radiations, and in most of the glasses the darkened areas gradually clear, or can be bleached by infrared radiation.

Other tenebrescent materials, such as some solids and some dyes, involve a more complex operation—somewhat similiar to fluorescent and laser materials. For example, these latter materials are "pumped" by light of a given color; the pumping light being absorbed, and raising certain electrons to excited orbits. When the excited electrons return to their normal orbits, the material emits light of a characteristic color. In the general tenebrescent material, light of a given color also raises certain electrons to their excited orbits, the excitation of these electrons absorbing the impinging light; and, this impinging light is absorbed rather than being transmitted, thus changing the material from transparent to opaque with respect to that particular color. Unlike the laser materials, however, when these excited electrons return to their normal orbits, they do not emit light; rather they emit heat, and are immediaely available to again absorb the impinging light. In this way, the particular color of light is continually absorbed, rather than being transmitted—and thus the tenebrescent material is opaque to the color of light. However, the material—and even the impinged-upon areas—remain transparent to light of other colors. Moreover, in their excited states, the electrons are now capable of being raised to still other orbits, and thus absorbing other specific colors of light. Thus, these tenebrescent materials are capable of having some areas opaque to certain colors, and having other areas transparent to these colors. Like the photochromic glass discussed above, the opacity of the impinged-upon area of the tenebrescent material reverts to transparency at a rate that depends on the material and upon ambient conditions.

Present-day research has produced a wide range of tenebrescent materials that are sensitive to various colors, and to infrared radiations; the sensitivity and time-constants of the various materials varying over wide ranges.

Referring back to the embodiment of the invention illustrated in FIGURE 1, the radiations in signal beam 14 traverse optical system 18, and rays 15 thereof are imaged on tenebrescent material 20 (in this illustration $Sm^{2+}$:CaF); infrared radiations in the 9,000 angstrom-unit wavelength range in beam 14 causing area 22—where light rays 16 from object 12 impinge on material 20—to become opaque to violet radiation in the 3300 angstrom-unit range. In general, area 22—depending upon the tenebrescent material 20—may become opaque to all light (i.e., if material 20 were photochromic glass), or may become opaque to a particular color of light. Thus, in FIGURE 1, tenebrescent material 20 has been exposed to the signal light from scene 10; and area 22 represents a portion of tenebrescent material 20 that is opaque to violet light—the rest of tenebrescent material 20 remaining relatively clear, since the other portions of scene 10 are relatively weak in the infrared type of radiation that causes material 20 to become opaque. In this way, the exposed tenebrescent material has produced a replica of the scene; the replica being—in this case—a negative of the original scene; and being temporary, since the tenebrescent material inherently reverts to overall transparency, and thus bleaches out the replica. However, in the present case, the temporary replica is continually renewed by the signal light from the original scene.

In FIGURE 1, a source of bias light 24, having the color or characteristic to which area 22 is opaque—violet light in the 3,300 angstrom-unit wavelength range in this case—is preferably positioned at the focal point of optical system 18; and, in accordance with well-known optical principles, the bias light from source 24 traverses the optical system 18, and emerges in the form of a collimated rays 26 of light. The rays 26 of the collimated violet bias light beam impinge upon the replica in the exposed tenebrescent material 20, and pass through the relatively clear portions thereof; but are blocked by the opaque spot 22.

It may thus be understood that the first stage, 25, comprising optical system 18 and tenebrescent material 20, has caused tenebrescent material 20 to produce a negative replica of the original scene; that is the original bright spot (star 12) is represented by an opaque spot, 22, and and the original dark area of scene 10 is represented by relatively transparent portions of tenebrescent material 20. Bias light source 24 is preferably of a relatively high intensity, so that light beam 27, that is emitted after traversing the negative replica formed by exposed material 20, is a bright "negative" of the scene 10. In other words, light beam 27 is an intense beam, having a "gap" corresponding to the location of opaque area 22.

In order to intensify the image even further, a second stage 28 is used; stage 28 comprising a second optical system 29, and a second tenebrescent material 30—in this case American Cyanamid polyester type 51–142.

The violet collimated light beam 27—now operating as a signal light—traverses optical system 29, and its emergent light rays 31 are imaged onto the second tenebrescent material 30. Here the imaging rays 31 of the relatively intense violet light beam 27 cause tenebrescent material 30 to become opaque, except in the area 34 where the "gap" in light beam 27 due to opaque spot 22, has prevented violet light from entering optical system 29. Thus, tenebrescent material 30 becomes opaque, except for a clear transparent spot 34. It will be realized that tenebrescent material 30 now contains a positive replica of the original scene 10; that is, it is relatively opaque, or dark, everywhere except for the light transparent spot 34 corresponding to star 12. As previously discussed, this positive replica in tenebrescent material 30 is also temporary, but—in this case also—is continually renewed by the signal light.

A second source 36 of bias light having a color or characteristic to which material 30 is now opaque, is preferably positioned at the focal point of optical system 29; and the light from bias light source 36 traverses optical system 29, and is emitted in the form of collimated bias light rays 38. In the present case, because of the characteristics of material 30, the bias light may be any color except violet. Rays 38 of the collimated bias light beam impinge upon the positive replica produced by exposed tenebrescent material 30; are transmitted through the clear transparent spot 34; but are blocked by the opaque portions thereof. The bias light rays 38 traversing clear transparent spot 34 impinge as a bright spot 42 on a screen 40, or on a suitable utilization device.

It will be realized that light sources 24 and 36 can be quite intense, and therefore the dark areas and the resultant bright spot 42 on screen 40 is a very intense high-contrast positive replica of the original scene 10.

In this way the relatively dim original scene 10 has been converted to a very bright display on screen 40, using simple lightweight solid-state components.

It will be realized that the operation of the device depends upon the ability of tenebrescent material 20 to become opaque to the signal light from scene 10, and to remain unaffected by the bias light from source 24. The same conditions apply to the second stage wherein tenebrescent material 30 must react to the signal light from source 24, and remain unaffected by the bias light from source 36.

It is therefore desirable to select light sources 24 and 36 that have specific spectral characteristics, and this result may in many cases be achieved by the use of specific lasers as light sources. Alternatively, filters may be selected to cause the light from sources 24 and 36 to have the desired spectral characteristics; or the optical systems may be coated with suitable dyes or color filters that cause light of the proper colors to be transmitted through the various stages of the device to achieve the desired effect but prevent undesired absorption of the bias light.

FIGURE 2 shows an arrangement that produces a positive replica in a direct manner. Here, reference-character 44 indicates a Fabry-Perot "etalon" (or "echelon") which is well known; and is discussed quite fully on pages 20–71 to 20–89 of MIL–HNDBK–141 entitled "Optical Design," issued by the Department of Defense on Oct. 5, 1962. The etelon illustrated in FIGURE 2 is an optical cavity of a particular length, whose ends are coated with selective reflective material as discussed in the above publication; so that the etelon acts as an interferometer designed to operate at a single given wavelength. Etalon 44 of FIGURE 2 is a reflecting etelon comprising a sheet 46 of tenebrescent material having reflective films 48 and 50 on its front and back surfaces. By using a sheet 44 of suitable thickness, and reflective films 48 and 50 of suitable characteristics as discussed in the above cited publication impinging light of a particular color bounces back and forth in the optical cavity a large number of times. As in an interferometer, the emergent light may be caused to have a constructive-interference pattern, or a destructive-interference pattern. In the present case, the emitted light has a destructive-interference pattern, and no light is emitted in the forward direction, all the light therefore being emitted back toward its source; in other words, reflecting etalon 44 is normally a very efficient mirror for light of a given color.

In FIGURE 2, bias light of a suitable color is produced by light source 52; the bias light traversing optical system 54 to be imaged on etalon 44 in the manner previously described. As explained above, the impinging bias light is normally reflected by etalon 44, so that no light normally traverses etalon 44.

Signal light from scene 10 traverses optical system 54, and is imaged on etalon 44, in the manner described previously. Also, as previously described, the tenebrescent material of etalon 44 absorbs the radiations from object 12; and the molecular structure of etalon 44 is changed at area 56. The changed molecular structure at area 56 modifies the internal light-transmissive property of the tenebrescent material, and therefore the reflective characteristic of etalon 44; and therefore bias light is no longer reflected by etalon 44; but rather is emitted from area 56. Thus the light emitted from etalon 44 is an intensified high contrast positive replica of scene 10; and corresponds to the result produced by the apparatus previously described. Here too, it should be noted that the replica tends to be temporary, due to the inherent bleaching characteristic of the tenebrescent material; but the continual impingement of the signal light produces a constant display. As indicated previously, the tenebrescent material and the bias light source are selected to produce optimal results in accordance with the type of radiations present in signal light beam 14.

Referring back to FIGURE 1, tenebrescent materials 20 and 30 may take the form of a transmission etelon. In this case, the sheet of material and its reflective films are of suitable thickness and dichroic characteristics to normally transmit all of the bias light. The impingement of the signal light changes the molecular structure of the tenebrescent material at the area of impingement, and thus reduces the light-transmission properties at that area. In this way a replica is formed in a different manner.

The present invention has been described in connection with a fixed scene, i.e., a star pattern in a dark sky. However, it may be used in situations where the scene is constantly changing. For example, it may be desired to monitor various areas of a factory at night, so that the viewed scene changes constantly. Under this condition, the inherent bleaching of the temporary replicas produced by the tenebrescent materials permit the intensified image to sequentially display the various scenes; although heat or infrared radiations may be used to more quickly bleach the temporary replicas.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. The combination comprising:
   means, comprising a signal light beam for imaging a scene on a tenebrescent material sensitive to said signal light beam, for producing a temporary replica of said scene on said tenebrescent material; and
   means for simultaneously directing a bias light beam to said temporary replica on said tenebrescent material, said impinging bias light beam being nonmodulated and noninformation-bearing, and having a uniform intensity across its entire cross-section, the spectral characteristics of said bias light beam being such as not to affect said temporary replica for causing the bias light emerging from said replica-bearing tenebrescent material to have a cross-sectional intensity variation having a one-to-one relation to said scene for producing a bright exact facsimile corresponding to said scene.

2. The combination comprising:
   means, comprising a signal light beam for imaging a scene on a tenebrescent material, sensitive to said signal light beam, for producing a temporary replica of said scene on said tenebrescent material;
   means for simultaneously directing a bias light beam to said temporary replica on said tenebrescent material, the spectral characteristics of said bias light beam being such as not to affect said temporary replica—whereby the bias light emerging from said replica-bearing tenebrescent material may be quite intense in order to produce a bright display corresponding to said scene;
   second means, comprising the bias light traversing said replica, for simultaneously imaging said first replica on a second tenebrescent material sensitive to said bias light beam for producing a second temporary replica of said scene on said second tenebrescent material; and
   second means for simultaneously directing a second bias light-beam through said second temporary replica on said second tenebrescent material, the spectral charactersitics of said second bias light beam being such as not to affect said second temporary replica.

3. The combination of claim 2 wherein said first replica is a negative, and second replica is a positive.

4. The combination comprising:
   means, comprising a signal light beam for imaging a scene on a tenebrescent material, sensitive to said signal light beam, for producing a temporary replica of said scene on said tenebrescent material;
   means for simultaneously directing a bias light beam to said temporary replica on said tenebrescent material, the spectral characteristics of said bias light beam being such as not to affect said temporary replica—whereby the bias light emerging from said replica-bearing tenebrescent material may be quite intense in order to produce a bright display corresponding to said scene;
   said tenebrescent material being in the form of a normally reflective Fabry-Perot etalon.

5. The combination of claim 4 wherein said temporary replica is a positive.

6. A solid-state image intensifier for intensifying the image of a dim scene, comprising:
   an optical system having an optical axis;
   a tenebrescent material, sensitive to the radiations from said scene, positioned transversely on said axis;
   means for causing said optical system to image said scene on said tenebrescent material for producing a temporary replica of said scene on said tenebrescent material;
   a source of bias light, having spectral characteristics that do not affect said temporary replica, positioned at a focal point of said optical system;
   means for directing said bias light through said optical system and said temporary replica for producing an emergent bias light beam whose cross section corresponds to said temporay replica.

7. The combination of claim 6 including:
   a second optical system positioned on said axis;
   a second tenebrescent material positioned transversely on said axis;
   means, comprising said emergent bias light beam, for causing said second optical system to image said first replica on said second tenebrescent material for producing a second replica of said scene;
   a second source of bias light, having spectral characteristics that do not affect said second replica, positioned at a focal point of said second optical system;
   means for directing bias light from said second source through said second optical system and said second replica for producing a second bias emergent light beam whose cross section corresponds to said scene;
   a utilization device; and
   means for directing said second emergent light beam to said utilization device.

8. An amplifier comprising a first material that provides decreased transmission of energy of a first frequency from areas thereof illuminated by energy of a second frequency, said first material being nonresponsive to said first frequency; and
   means for simultaneously illuminating the first material with a signal beam of said second frequency and with a bias beam of said first frequency.

9. The combination of claim 8, including:
   a second material that provides decreased transmission of energy of a third frequency from areas thereof illuminated by energy of said first frequency, said second material being nonresponsive to said third frequency;
   means for simultaneously illuminating the second material with light transmitted from the first material and with a bias beam of said third frequency; and
   output means responsive to light transmitted from said second material.

References Cited
UNITED STATES PATENTS

| | | | |
|---|---|---|---|
| 3,085,469 | 4/1963 | Carlson | 88—24 |
| 3,134,297 | 5/1964 | Carlson et al. | 88—24 |
| 3,327,120 | 6/1967 | Weiss | 250—83.3 |

RONALD L. WIBERT, Primary Examiner

U.S. Cl. X.R.

250—83; 356—112